United States Patent
Jones et al.

(10) Patent No.: US 12,236,412 B2
(45) Date of Patent: Feb. 25, 2025

(54) METHODS AND SYSTEMS FOR TRACKING CARTS AND RETAIL PRODUCTS IN A SHOPPING SPACE

(71) Applicant: Walmart Apollo, LLC, Bentonville, AR (US)

(72) Inventors: Nicholaus A. Jones, Fayetteville, AR (US); Robert J. Taylor, Rogers, AR (US); Aaron J. Vasgaard, Rogers, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/081,467

(22) Filed: Dec. 14, 2022

(65) Prior Publication Data
US 2023/0122649 A1    Apr. 20, 2023

Related U.S. Application Data

(63) Continuation of application No. 17/348,582, filed on Jun. 15, 2021, now abandoned, which is a
(Continued)

(51) Int. Cl.
*G06Q 20/20* (2012.01)
*G06Q 10/08* (2024.01)
*G07G 1/00* (2006.01)

(52) U.S. Cl.
CPC ......... *G06Q 20/202* (2013.01); *G06Q 20/203* (2013.01); *G06Q 20/208* (2013.01); *G07G 1/0081* (2013.01)

(58) Field of Classification Search
CPC .. G06Q 20/202; G06Q 20/203; G06Q 20/208; G06Q 10/087; G06Q 30/0201; G07G 1/0081
See application file for complete search history.

(56) References Cited

U.S. PATENT DOCUMENTS 5,821,512 A  *  10/1998  O'Hagan ............... H01M 10/44
                                                      235/383
6,052,692 A  *   4/2000  Anderson ............ H04N 1/2112
                                                      707/999.102
(Continued)

FOREIGN PATENT DOCUMENTS

CN          204250118        4/2015
GB            2565004        1/2019
(Continued)

OTHER PUBLICATIONS

Chandrasekar, P. et al.; "Smart Shopping Cart with Automatic Billing System through RFID and ZigBee;"Information Communication & Embedded Sytems; 2014; pp. 1-4.
(Continued)

*Primary Examiner* — Michael Jared Walker
*Assistant Examiner* — Reva R Moore
(74) *Attorney, Agent, or Firm* — Fitch, Even, Tabin & Flannery, LLP (57) ABSTRACT

In some embodiments, apparatuses and methods are provided herein useful for a retail facility to maintain information regarding product location, in part, from correlating a shopper's cart path and their purchased items with those of other shoppers. In some approaches, the methods and apparatuses may determine a cart path for a particular shopping cart by analyzing aisle markers captured by an image capturing device in the shopping cart, associate that cart path with the purchased items from that shopping cart, and compare the associated cart path and purchased items with similar information from other customers. In some examples, by comparing the associated cart paths and purchased items form a plurality of customers, an aisle location of one of the retail items is identified and the database of aisle locations and retail items may be updated accordingly.

20 Claims, 3 Drawing Sheets

Related U.S. Application Data continuation of application No. 15/585,285, filed on May 3, 2017, now abandoned.

(60) Provisional application No. 62/332,700, filed on May 6, 2016.

(56) References Cited

U.S. PATENT DOCUMENTS

| | | | |
|---|---|---|---|
| 6,218,796 | B1 | 4/2001 | Kozlowski |
| 7,693,757 | B2 | 4/2010 | Zimmerman |
| 7,944,354 | B2 | 5/2011 | Kangas |
| 8,429,004 | B2 | 4/2013 | Hamilton |
| 8,630,924 | B2 | 1/2014 | Groenevelt |
| 8,965,561 | B2 | 2/2015 | Jacobus |
| 9,064,161 | B1 | 6/2015 | Boman |
| 9,135,491 | B2 | 9/2015 | Morandi |
| 9,152,149 | B1 | 10/2015 | Palamarchuk |
| 9,247,211 | B2 | 1/2016 | Zhang |
| 10,565,554 | B2 | 2/2020 | Jones |
| 2004/0186813 | A1 | 9/2004 | Tedesco |
| 2006/0010027 | A1* | 1/2006 | Redman ......... G06Q 10/063116 705/7.29 |
| 2006/0210115 | A1* | 9/2006 | Nemet ................... G06Q 10/08 382/104 |
| 2007/0129849 | A1 | 6/2007 | Zini |
| 2008/0189170 | A1* | 8/2008 | Ramachandra ........ G06Q 30/02 705/7.29 |
| 2009/0192921 | A1 | 7/2009 | Hicks |
| 2009/0240590 | A1 | 9/2009 | Or |
| 2009/0265671 | A1 | 10/2009 | Sachs |
| 2010/0121807 | A1 | 5/2010 | Perrier |
| 2012/0217080 | A1 | 8/2012 | Besler |
| 2012/0296751 | A1 | 11/2012 | Napper |
| 2013/0056330 | A1 | 3/2013 | Chierego |
| 2013/0137449 | A1 | 5/2013 | Kuo |
| 2014/0002646 | A1 | 1/2014 | Scheffer |
| 2014/0270747 | A1 | 9/2014 | Maltese |
| 2015/0029339 | A1 | 1/2015 | Kobres |
| 2015/0095189 | A1 | 4/2015 | Dharssi |
| 2015/0381870 | A1 | 12/2015 | Weng |
| 2016/0082937 | A1 | 3/2016 | Nakaoka |
| 2017/0323281 | A1 | 11/2017 | Jones |
| 2021/0312414 | A1 | 10/2021 | Jones |

FOREIGN PATENT DOCUMENTS

| | | |
|---|---|---|
| GB | 2567756 | 4/2019 |
| JP | 2007058759 | 3/2007 |
| WO | 2008029159 | 3/2008 |
| WO | 2015150622 | 10/2015 |
| WO | 2016055815 A1 | 4/2016 |
| WO | 2017192826 | 11/2017 |
| WO | 2017214116 | 12/2017 |

OTHER PUBLICATIONS

PCT App. No. PCT/US17/31018; International Search Report & Written Opinion mailed Aug. 7, 2017; 18 pages.
PCT; App. No. PCT/US17/36114; International Search Report and Written Opinion mailed Aug. 25, 2017; 21 pages.
PCT; App. No. PCT/US2017/031018; International Preliminary Report on Patentability mailed Nov. 15, 2018; (9 pages).
PCT; App. No. PCT/US2017/036114; International Preliminary Report on Patentability mailed Dec. 20, 2018; (10 pages).
UKIPO; App. No. GB1818226.1; Examination Report mailed Feb. 3, 2022; (3 pages).
UKIPO; App. No. GB1818226.1; Examination Report mailed Aug. 24, 2021; (4 pages).
UKIPO; App. No. GB1818226.1; Examination Report mailed Nov. 1, 2021; (3 pages).
UKIPO; App. No. GB1818226.1; Examination Report mailed Dec. 15, 2021; (3 pages).
UKIPO; App. No. GB1820135.0; Examination Report mailed May 19, 2021; (2 pages).
UKIPO; App. No. GB1820135.0; Intention to Grant mailed Dec. 23, 2021; (2 pages).
USPTO; U.S. Appl. No. 15/585,285; Notice of Allowance mailed Mar. 15, 2021; (pp. 1-16).
USPTO; U.S. Appl. No. 15/585,285; Office Action mailed Apr. 7, 2020; (pp. 1-22).
USPTO; U.S. Appl. No. 15/585,285; Office Action mailed May 22, 2019; (pp. 1-13).
USPTO; U.S. Appl. No. 15/585,285; Office Action mailed Oct. 2, 2019; (18 pages).
USPTO; U.S. Appl. No. 15/585,285; Office Action mailed Oct. 23, 2020; (pp. 1-20).
USPTO; U.S. Appl. No. 15/585,317; Notice of Allowance mailed Jan. 16, 2020; (pp. 1-2).
USPTO; U.S. Appl. No. 15/585,317; Office Action mailed Jun. 13, 2019; (pp. 1-12).
USPTO; U.S. Appl. No. 17/348,582; Notice of Allowance and Fees Due (PTOL-85) mailed Oct. 7, 2022; (pp. 1-11).

* cited by examiner

METHODS AND SYSTEMS FOR TRACKING CARTS AND RETAIL PRODUCTS IN A SHOPPING SPACE

CROSS-REFERENCE TO RELATED APPLICATION

This application is a continuation of U.S. application Ser. No. 17/348,582, filed Jun. 15, 2021, which is a continuation of U.S. application Ser. No. 15/585,285, filed May 3, 2017, now abandoned, which claims the benefit of U.S. Provisional Application No. 62/332,700, filed May 6, 2016, each of which is incorporated herein by reference in its entirety.

TECHNICAL FIELD

This invention relates generally to monitoring in-store activity and retail items.

BACKGROUND

As a convenience to shoppers, many retail facilities offer shopping carts that customers can use while they are shopping within the facility. These shopping carts generally have a basket portion, a handle, and wheels such that the shopping carts can easily be moved around a retail shopping facility as users fill the shopping cart with various items they intend to purchase. Further, modern retail environments often look for ways to further improve the customer experience, such as by providing convenient, ready access to retail products or items. To that end, a retail facility may find it advantageous to make locating products of interest easier for customers.

BRIEF DESCRIPTION OF THE DRAWINGS

Disclosed herein are embodiments of systems, apparatuses and methods pertaining to maintaining a database of item locations, in part, from cart path information obtained from cameras in shopping carts. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to determine where a customer visited within a retail facility, a customer's pathway through a retail facility, and/or the aisle location of various retail items within the retail facility. Accordingly, the systems, apparatuses and methods permit maintenance of a database of item locations, in part, from cart path information obtained from cameras in shopping carts and a list of purchased items obtained from point of sale terminals or registers. By one approach, such an item location system includes a database of retail items within a retail facility and an aisle location associated with some of the retail items, the retail facility having shopping aisles with aisle markers disposed therein, a plurality of shopping carts with a camera or image capturing device configured to record the aisle markers by which the shopping cart travels, and a control circuit coupled to the database and a point of sale terminal in the retail facility or location. The control circuit configured to detect a cart path for a particular one of the plurality of shopping carts by receiving the recorded aisle markers from the particular shopping cart and a list of purchased items for that cart from the point of sale terminal, associating the cart path with the purchased items, and comparing the associated cart path and list of purchased items from the particular shopping cart with similar information from other customers. For example, the control circuit can compare associated cart paths and purchased items of a plurality of customers. In one illustrative approach, the control circuit may further identify a particular aisle location of one of the plurality of retail items based on overlap between the associated cart path and list of purchased items and other customer cart paths and purchased items and updated the database to include the particular aisle location identified for one of the retail items.

As used herein, an aisle location is generally one or more physical locations within a retail facility or location where a particular retail item can be found. In some embodiments, the database includes a plurality of aisle locations for some retail items. For example, the batteries may be located near the electronics department, in a section of the toy aisle, and near home appliances, among other locations. In this example, batteries may have three aisle locations stored in the database of aisle locations and retail products. By one approach, a database may include a primary aisle location and additional or supplemental aisle location(s). Further, if the system or method described herein identifies an aisle location for a retail product in the database for which no other aisle location information has been provided, the identified aisle location may be used as a primary aisle location. Alternatively, if other aisle locations are saved within the database, an identified aisle location may be added to the database as an additional location, if one or more other aisle locations are stored in the database.

In one embodiment, the shopping system also may include an associate electronic device that is in communication with the control circuit and database and may display the aisle location(s) of retail items when queried. Further, the associate electronic device may receive information from an associate and update the database of aisle locations accordingly. For example, the associate electronic device may be employed to add a retail item into the database, add an aisle location of one of the plurality of retail items in the database, and update at least one of the retail items or aisle locations associated therewith.

In addition to aisle locations, the cart path information and list of purchased items can be analyzed to determine from where a particular purchased item was retrieved. By analyzing the associated cart path and list of purchased items, the control circuit may identify a likely retrieval location for a purchased item. As used herein, a purchased item will have only one retrieval location from which that particular purchased item was retrieved, but a retail item may have a plurality of aisle locations where such retail items are located within the retail facility. For example, while AA batteries may be found in aisles 2, 27, 29, and 30, the AA batteries in a particular shopper's cart will have come from only one of those locations.

In one approach, the system may determine a low shelf supply based upon the receipt of a number of identical retrieval locations. Further, by one approach, a store associate may be sent a notification regarding the low shelf supply, such as through the associate electronic device.

In one exemplary embodiment, the shopping carts have an image capturing devices mounted thereto. By one approach, the image capturing device is a camera configured to capture or record pictures or video images, and it may be mounted to a handle (or other area) of the shopping cart. To that end, U.S. Patent Application No. 62/348,488, filed Jun. 10, 2016 is incorporated herein in its entirety.

In one approach, the shopping aisles and displays include aisle markers that identify the aisle in which the markers are disposed. Furthermore, in one configuration, the aisle markers are disposed at predetermined intervals along the shopping aisles. For example, an image or aisle marker may be disposed every eight feet, every four feet, or even every two feet, among other configurations.

In operation, the control circuit may estimate a continuous cart path based on the aisle markers recorded by the image capturing device and the order of recordation thereof. In another embodiment, the system estimates a time spent at a particular location along the continuous path within the retail facility based on the time lapse between recordation of the aisle markers, a timestamp on the captured images, and/or a recurrence of the same aisle markers.

In one illustrative embodiment, when the shopping cart is brought to the point of sale terminal for checkout, the recorded images of the aisle markers or a listing of the aisle markers themselves are communicated or transferred from the image capturing device and/or a memory associated therewith to the control circuit, point of sale terminal, or another device in communication therewith. After communicating or transferring the images or information regarding the aisles markers, the image capturing device or memory associated therewith can be cleared such that the shopping cart may be used by another shopper. By one approach, the image capturing device is configured to clear the recorded aisle markers after the control circuit has detected the cart path of the particular shopping cart from the recorded images.

In one embodiment, the image capturing device primarily captures images of the aisle markers. In another embodiment, the image capturing device may record images of the aisle marker and the adjacent shelf space and products thereon.

In another illustrative embodiment, a retail location or facility is able to maintain information regarding product location, in part, with information gathered from correlating a shopper's cart path and their purchased items with those of other shoppers according to a method described herein. By one approach, the method includes, for example, maintaining a database of aisle locations associated with retail items, capturing pathway images of aisle markers disposed within the shopping aisles via an image detection device mounted in a shopping cart, receiving pathway images from the shopping cart at a point of sale terminal, receiving a list of purchased items from the point of sale terminal and associating the purchased items with the pathway images, identifying a particular aisle location of one of the purchased retail items by comparing the associated list of purchased retail items and pathway images with other customer pathways and purchased items associated therewith, and updating the database accordingly.

By one approach, updating the database includes adding a particular aisle location as an additional aisle location or a primary aisle location if no other aisle location information is stored within the database.

In one embodiment, when a customer is interested in where a particular retail item is shelved, a store associate may query the database, which may notify the associate of one or more aisle locations of the item of interest.

In addition to aisle locations, the method also may include extracting a retrieval location of at least one of the purchased items by analyzing the pathway image(s) and the associated purchased retail item(s). In this manner, a low shelf supply may be determined based on the extraction of identical retrieval locations a predetermined number of times within a certain amount of time. This information may be provided to a store associate who can restock the display shelves.

In addition to providing information about the stock levels of retail products, a retail location may be of interest when analyzing consumer behaviors within the retail facility. Thus, a store may be interested in the aisles visited by a customer and the time spent at various aisle locations. Thus, the method also may include estimating a continuous cart path based upon the aisle markers recorded by the image capturing device and the time lapse between recordation of the aisle markers, the repeated capturing of a particular aisle marker, or timestamps of the images captured.

By having an updated database of aisle locations associated with the retail items, a store associate can direct consumers to the locations of particular retail items upon request. Further, by knowing where the purchased items are being retrieved from, the store associates are able to replenish the shelves from which the items were retrieved. Further, if a retail item is not frequently retrieved from a particular aisle location (such that it does not show up in many different cart pathways), then a store associate may remove that retail item from that shelf location such that the shelf space may be repurposed to display different retail items.

In yet another configuration, an aisle location associated with a retail item may be removed from the database if it is only highly infrequently found in pathway images correlating to the purchased retail items. For example, retail items can be incorrectly shelved or a customer may decide they no longer wish to purchase an item and may merely remove the item from their cart and place it on a nearby shelf without regard for where the item properly belongs. Thus, when comparing other customer pathways and purchased items, the control circuit may be able to determine or highlight outliers and remove them from the database. In one illustrative approach, the control circuit may flag an aisle location for further consideration by an associate or may remove it from the database of aisle locations. In one illustrative embodiment, the control circuit may include a tentative aisle location in the database, but may flag this as suspect or may give it a low degree of certainty.

As used herein, the shopping carts may include baskets with wheels, flatbed carts, bins, and handheld baskets, among others that are moved around a retail facility or location. Further, the retail facility may be any type of shopping facility or location in which products are displayed, for sale, and/or distributed at numerous points around the facility such that the customer travels through the space to retrieve desired products. Further, the facility may be any of a number of sizes or formats and may include products from one or more merchants. For example, a facility may be a single store operated by one merchant or may be a collection of stores covering multiple merchants such as a mall.

Figure 1:
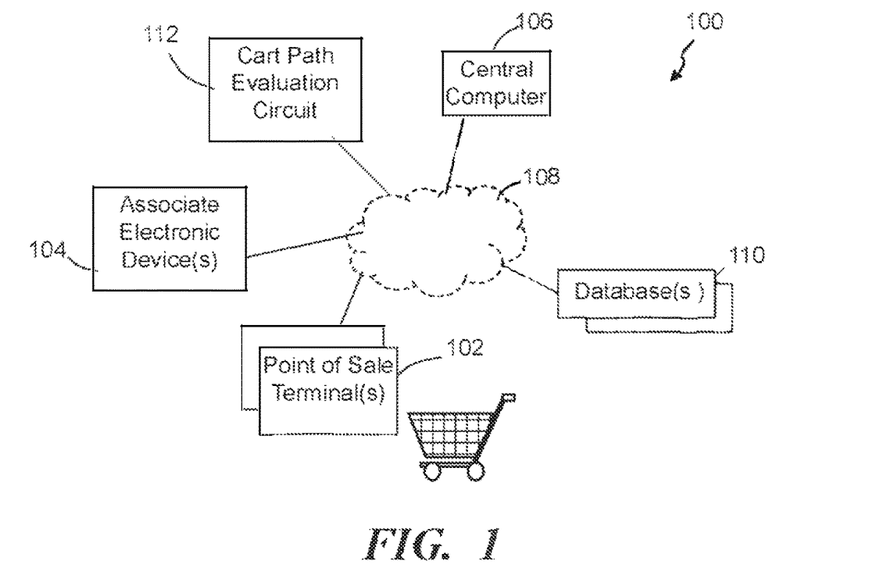
FIG. 1 is a simplified block diagram of an exemplary shopping system in accordance with some embodiments.

FIG. 1 illustrates a simplified block diagram of an exemplary shopping or item location system 100, according to some embodiments, which facilitates maintaining a database of item locations, in part, from cart path information obtained from cameras in shopping carts and lists of purchased items obtained from point of sale terminals or registers within the retail facility. The item location system 100 includes a database 110 of a plurality of retail items disposed within a retail facility and an aisle location associated with some of the retail items. The database 110 may be queried by an associate electronic device 104 for information on an aisle location for a particular retail product. In addition, the information in database 110 may be compared with information from the point of sale terminal(s) 102 and the cart pathway information provided to the control circuit or central computer 106 and possibly a cart path evaluation circuit 112 either directly or indirectly, such as through a network 108. In some configurations, the network 108 also may provide database 110 and central computer 106 information to a headquarters location 401 (FIG. 4) that maintains information on aisle location information for several retail facilities and a planogram that provides an intended or master floor plan and/or aisle location destinations.

As illustrated in FIG. 1, the point of sale terminal(s) 102, the associate electronic device(s) 104, central computer 106, the database(s) 110, and the cart path evaluation circuit 112, if present, may be communicatively coupled, either directly or indirectly, such as over one or more distributed communication networks 108, which may include, for example, LAN, WAN, Internet, cellular, Wi-Fi, and other such communication networks or combinations of two or more of such networks.

By one approach, a retail location may have shelves 202 (see FIG. 2) with aisle markers 208 disposed therein. As used herein, aisles may include both the passageway between shelves and the passageway between shelves and other structures. By one approach, the aisle markers 208 are disposed only on one side of the aisle. By another approach, the aisle markers 208 are disposed on each side of an aisle. The aisle markers may be disposed in an alternating relationship down the aisle, or alternatively, the aisle markers may be disposed continually down the aisle directly across from one another. In addition, an aisle end cap or aisle end display may have aisle markers 208 disposed thereon.

Figure 2:
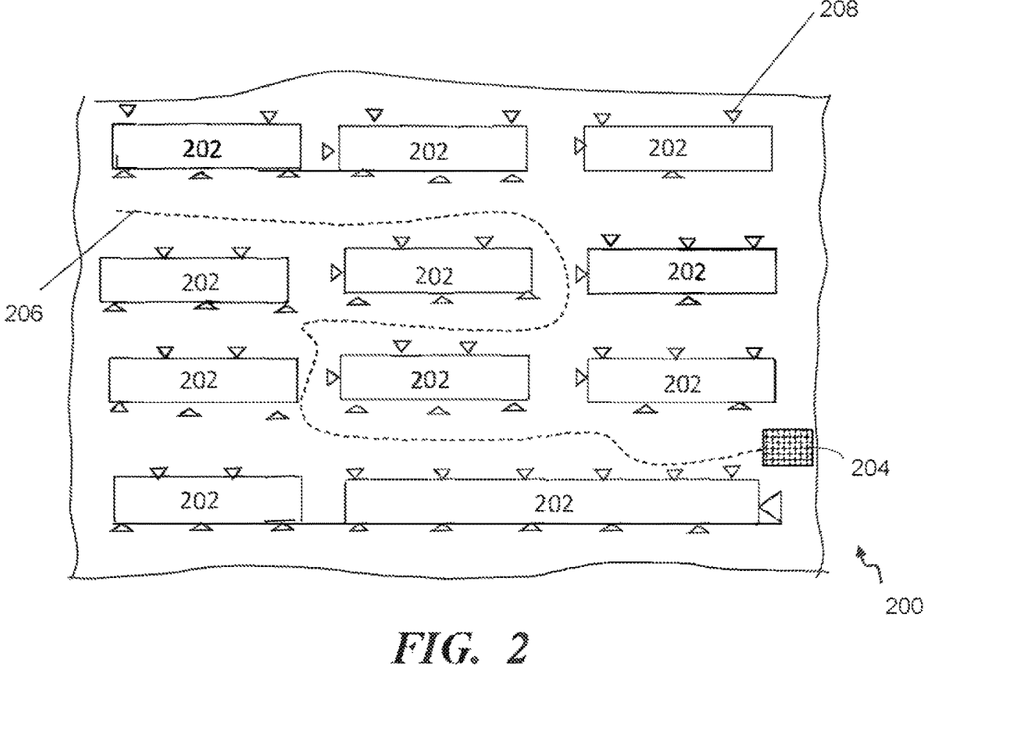
FIG. 2 is a schematic illustration of a shopping space in accordance with several embodiments.

As used herein, an aisle marker may be anything that the image capturing device can visually capture, such as, for example, a barcode, a QR code, an alphanumeric image, among others. The aisle markers 208 may be disposed at any portion of an aisle or shelf. In one illustrative approach, the aisle markers are disposed at the base of an aisle on an aisle shelf, base, footing, or another structure associated with the aisle or shelf. In another illustrative approach, the aisle markers are on the floor adjacent the bottom of the aisle shelf. In yet another embodiment, the aisle markers are disposed on the aisle shelves at a height approximately the same as the height of the cart handle or other portion of the cart to which the image capturing device is mounted. For example, if the aisle markers are generally disposed at the base of an aisle shelf, the image capturing device may be mounted at a lower portion of the cart. In one exemplary embodiment, the image capturing device is focused or directed toward the location of the aisle markers 208 along the aisles. For example, if the aisle markers 208 are generally disposed along the base of the aisle near or adjacent the facility floor, the image capturing device, if mounted on the cart handle, will be directed downward such that the image capturing device captures images of the aisle markers 208.

As the cart 204 is advanced through the retail facility, the camera or image capturing device mounted thereon captures the aisle markers 208 by which the cart 204 passes. In addition, the image capturing device also may capture the order by which the cart 204 advanced by the aisle markers. In one illustrative approach, the image capturing device may obtain a timestamp or other identifying information that allows the control circuit to determine the progression of the cart and the amount of time spent at various locations.

As shown in FIG. 2, the cart 204 may advance through a portion of a retail facility 200 via cart path 206, and the central computer 106 may determine the path taken by the shopping cart 204 by analyzing the aisle markers 208 recorded by the image capturing device mounted on the shopping cart 204. Further, as discussed below, the images recorded of the aisle markers may be transferred to the central computer 106 at the point of sale terminal 102, such as when the shopper is paying for the retail items selected while shopping in the retail facility.

In one exemplary embodiment, a shopper has their purchases scanned and pays for their purchases at a point of sale terminal 102 within the retail facility. At the point of sale terminal 102, possibly during the transactions between the retail facility and the shopper, the images taken by the image capturing device are transferred to a device that may provide the images to the central computer 106, either directly or indirectly, such as through a network 108. Furthermore, the point of sale terminal 102 provides an account of the purchased items, such as a list, record, catalog, or index of purchased items to the central computer 106.

To evaluate the information obtained from the shopping cart (including the recorded aisle markers) and the retail items purchased at the point of sale terminal 102, the point of sale terminal 102, central computer 106, or the cart path evaluation circuit 112 (which may be provided the captured aisle marker images and the list of purchased items) or similar device may be configured to associate the purchased items with the aisle markers obtained and the cart path derived therefrom. Further, the central computer 106 and/or the cart path evaluation circuit 112 may detect a cart path of a particular shopping cart based on the recorded aisle markers for the particular shopping cart. Then, this cart path (possibly along with the aisle markers themselves) and the purchased items, may be correlated or associated with one another.

As used herein, the cart path may include a list of the aisle markers recorded by an image capturing device, and a continuous cart path may further include the order of recorded aisle markers and possibly time spent at a particular aisle maker, which may be obtained, for example, by a timestamp on the aisle marker or a repeated capture of a particular aisle marker.

By one approach, the central computer 106 and/or the cart path evaluation circuit 112 subsequently compare the cart path and associated retail items with similar information (cart paths and associated retail items) from other customers. In this manner, the central computer 106 and/or the cart path evaluation circuit 112 may identify a particular location of one of the retail items based upon overlap between the associated cart path and purchased retail items with similar information from other customers and possibly the information in the database of retail items or another database, such as, for example, a database of cart paths and associated retail items.

By one approach, a database of cart paths and associated retail items is maintained and each additional data point (cart path and associated retail items) is evaluated in comparison with the database of cart paths and associated retail items. For example, if a customer buys AA batteries, toilet paper, and a birthday card and the customer's cart recorded images of aisle markers in aisles 2, 12, and 33, this information can be compared with other customer information and/or with a database of cart paths and associated retail items. If this particular customer is compared with another customer who purchased large athletic socks, potato chips, printer ink, and AA batteries and this customer's cart recorded images of aisle markers in aisles 2, 15, 16, and 17, both of these customers appear to have obtained batteries from aisle 2. If the database of retail items does not previous indicate that AA batteries are located in aisle 2, the database may be updated to indicate such information. By one approach, if the database of retail items does not include an aisle location, the database may be updated to indicate that this location is a primary or additional aisle location if other aisle locations are stored within the database. The database also may be updated to note the recent purchase activity as discussed below.

Depending on the number of purchased items and aisle markers, the central computer 106 and/or the cart path evaluation circuit 112 may be able to determine a likely aisle location, but may not be able to definitively confirm such an aisle location. In this circumstance, the database may be updated to indicate a likely aisle location for a particular retail item. In one illustrative approach, a level of confidence may be assigned to a likely aisle location.

In the previous example, in addition to determining or confirming that aisle 2 has shelf space devoted to AA batteries, the aisle 2 location is the retrieval location of those purchased AA batteries or the location from which the particular AA batteries purchased by these two customers were retrieved. As mentioned above, a purchased retail item typically has only one retrieval location, but a retail item may have a plurality of aisle locations where those retail items are located or shelved within the retail facility. Thus, while AA batteries may be found in aisles 2, 27, 29, and 30, the AA batteries found in the two example carts discussed and compared were both obtained from aisle 2. Thus, these AA batteries have a retrieval location of aisle 2. In one illustrative approach, a store associate may use this information to know when a shelf location is running low on a particular retail item and may require restocking. In short, in addition to determining an aisle location of retail items, the central computer 106 and/or the cart path evaluation circuit 112 may also determine a retrieval location of purchased items. This information may then be communicated to a store associate, such as, for example, via the associate electronic device 104 in communication with the network 108.

As used herein, the image capturing device may include a camera or other image recorder mounted to a handle or other structure of a shopping cart. By one approach, the camera is configure to record pictures or video images of aisle markers. In another illustrative embodiment, the image capturing device is configured to take pictures or images of shelf space and products on the shelf during customer use. This may be in addition to recording the aisle markers.

In one illustrative approach, the recorded aisle markers or images are communicated or transferred to the point of sale terminal or another device proximate the point of sale terminal when the customer is paying for the retail items collected throughout the retail facility. By one approach, the shopping cart has wireless transmission capabilities that permit a quick transfer to the central computer 106. Further, once the images or aisle markers are transferred, the memory of the images on the shopping cart can be cleared such that a new shopper can begin using the shopping cart, which will record the new user's cart path and aisle markers.

Figure 3:
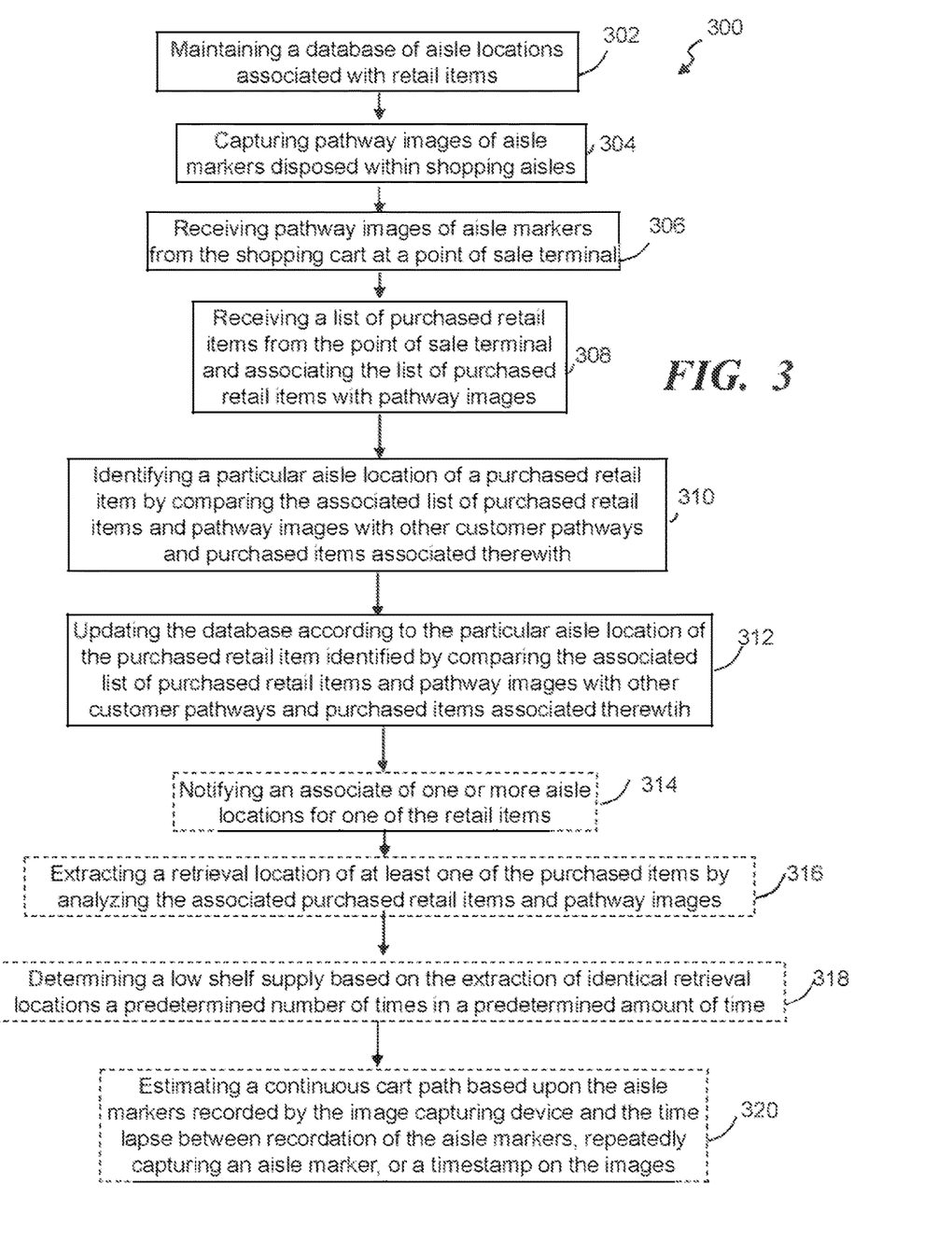
FIG. 3 is a flow diagram of a method in accordance with several embodiments.

Referring now to FIG. 3, a process 300 for locating and monitoring items within a retail facility according to some embodiments discussed herein is illustrated. The method 300 includes, for example, maintaining 302 a database of aisle locations associated with retail items and capturing 304 pathway images of aisle markers disposed within shopping aisles.

By one approach, pathway images of aisle markers are received 306 from the shopping cart at the point of sale terminal. The process 300 further includes receiving 308 a list of purchased retail items from the point of sale terminal and associating the list of purchased retail items with pathway images.

In step 310, the process 300 identifies a particular aisle location of a purchased retail item by comparing the associated list of purchased retail items and pathway images with other customer pathways and purchased items associated therewith. As discussed above, by one approach, this comparison may be made by comparing a customer data point with a database of other customer pathway images and purchased items.

Further, after identifying 310 an aisle location, the process 300 may update 312 the database of aisle locations according to the particular aisle location identified by comparing the purchased retail item and pathway images with similar information from other customers. By updating 312 the database of aisle locations, the database may be updated to include a primary or additional aisle location if an aisle location is already present in the database. In another embodiment, updating 312 the database may include removing a stored aisle location from the database if the store aisle location is very infrequently found in the pathway images and purchased items. For example, if a retail product is picked up from a location where it is not typically shelved (such as when a customer removes an item from their cart but does not re-shelve the item from where it was initially retrieved), the database may have been updated with inaccurate information and these inaccurate aisle locations may be removed from the database based on the frequency of the aisle or retrieval locations received at the point of sale terminals.

In step 314, the process 300 may further include notifying an associate of one or more aisle locations for a particular retail item. This may be facilitated via an associate electronic device 104 that may permit an associate to query one or more databases 110 of retail items. The associate electronic devices 104 also may permit a store associate to manually input an aisle location for a retail item. For example, if a store associate sets up a seasonal display that included outdoor holiday lights and extension cords, the store associate may update the database 110 to indicate that the holiday lights are extension cords are now found in the seasonal display.

In one exemplary approach, the method 300 further includes extracting 316 a specific retrieval location of at least one of the purchased items by analyzing the associated purchased retail items and pathway images. Furthermore, the method 300 also may include determining 318 a low shelf supply based on that information. For example, a low shelf supply may be determined based on the repeated extraction of the same retrieval location for a particular item. In this manner, if an identical retrieval location for a particular retail item is obtained or extracted a predetermined number of times, the central computer 106 may notify a store associate about the issue such that it can be addressed by restocking the retail item.

In step 320, the method also may include estimating a continuous cart path based upon the aisle markers recorded by the image capturing device and the time lapse between recordation of the aisle markers, repeatedly capturing an aisle marker, or a timestamp on the images captured. This may be of particular interest when creating or modifying a store layout or planogram. For example, if a particular display is attracting a significant amount of interest, the store may decide to place this display in an area that will drive traffic through other aisles of potential interest.

Figure 4:
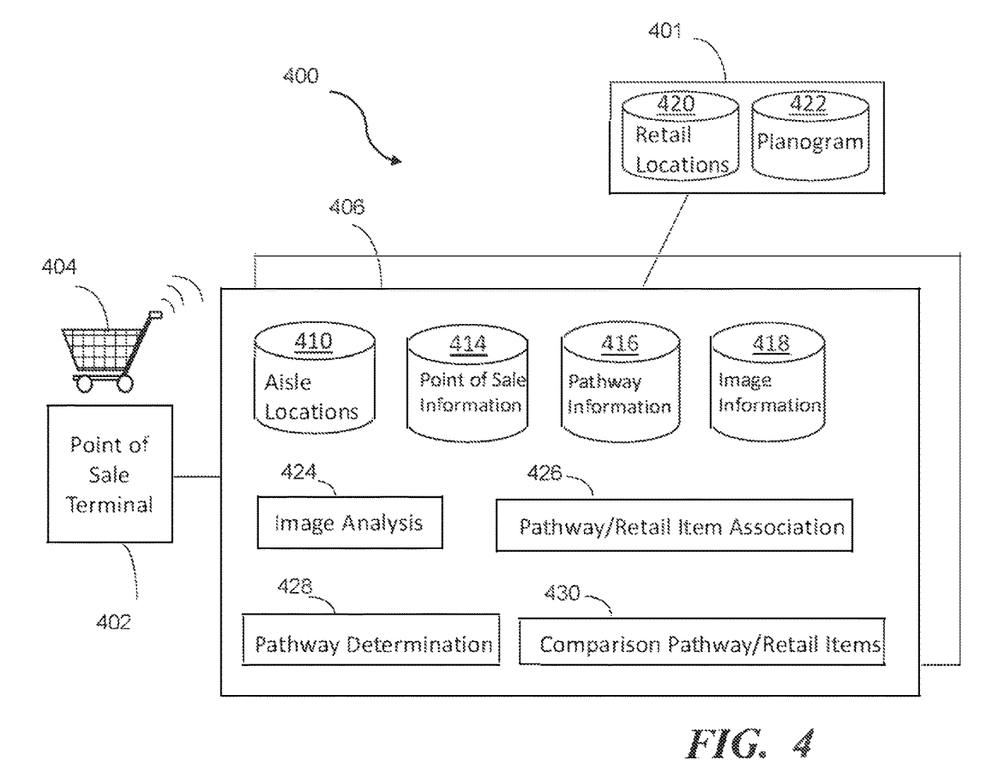
FIG. 4 illustrates an exemplary item location system in accordance with several embodiments.

FIG. 4 illustrates one exemplary item location system 400 with an item location server 406 (that may analyze and store information about retail products within the retail facility) and is in communication with a point of sale terminal 402 and/or shopping carts 404. As suggested above, store information about locations of retail products located in a store's item location server 406 may be communicated to a central planner or headquarters 401, which also may be in communication with other similar such store servers 406 from other retail locations. By one approach, the headquarters 401 that coordinates with several retail facilities may have a database 420 of aisle locations within different retail locations and also a planogram 422 of where the headquarters 401 intends the retail items to be shelved in the various retail facilities. In this manner, the headquarters 401 can analyze the actual shelf location of retail items found in the database 420 and compare it with the planogram 422 to determine how accurately the associates at a given store or retail facility are organizing the facility.

As illustrated in FIG. 4, the item location server 406 may include a database of aisle locations 410, a database of information received from the point of sale terminals 414, a database of pathway information 416, and a database of image information 418, which may be of particular interest if the image capturing devices records or takes images of shelf space and product placement on the shelves. Though item location server 406 is illustrated as having these databases within the item location server 406, these databases also may be stored outside of the server 406 and merely in communication with server 406.

In addition to a variety of databases, the item location server 406 also may provide image analysis 424, pathway and purchased retail item association 426, pathway determination 428, and/or comparison of different customer's associated pathways and purchased retail items 430. Though item location server 406 is illustrated as providing these capabilities, these also may be provided by other servers or devices in communication with the item location server 406.

Figure 5:
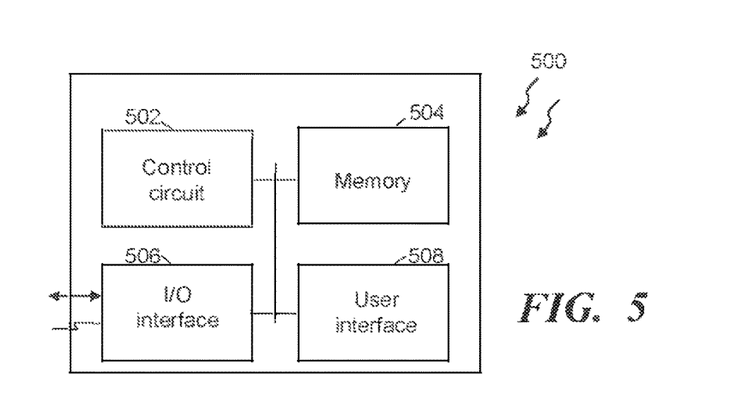
FIG. 5 illustrates an exemplary system for use in implementing systems, apparatuses, devices, methods, techniques and the like in tracking carts and products in a shopping space in accordance with some embodiments.

The methods, techniques, systems, devices, services, servers, sources and the like described herein may be utilized, implemented and/or run on many different types of devices and/or systems. Referring to FIG. 5, there is illustrated a system 500 that may be used for any such implementations, in accordance with some embodiments. One or more components of the system 500 may be used to implement any system, apparatus or device mentioned above or below, or parts of such systems, apparatuses or devices, such as for example any of the above or below mentioned item location system 100, central computer system 106, point of sale terminal(s) 102, associate electronic device(s) 104, cart path evaluation circuit 112, database 110, item location system 400, parts thereof, and the like. However, the use of the system 500 or any portion thereof is certainly not required.

By way of example, the system 500 may include one or more control circuits 502, memory 504, and input/output (I/O) interfaces and/or devices 506. Some embodiments further include one or more user interfaces 508. The control circuit 502 typically comprises one or more processors and/or microprocessors. The memory 504 stores the operational code or set of instructions that is executed by the control circuit 502 and/or processor to implement the functionality of the item location system 100, central computer system 106, point of sale terminal(s) 102, associate electronic device(s) 104, cart path evaluation circuit 112, database 110, the item location system 400, parts thereof, and the like. In some embodiments, the memory 504 may also store some or all of particular data that may be needed to maintain a database of aisle locations associated with retail items located within a retail facility, capture pathway images of aisle markers disposed within shopping aisles, receive the pathway images from the shopping cart at a point of sale terminal, receive a list of purchased retail items from the point of sale terminal and associating the list of purchased retail items with pathway images, identify a particular aisle location of one of the purchased retail items by comparing the associated list of purchased retail items and pathway images with similar information from other customers, and/or update the database accordingly.

It is understood that the control circuit 502 and/or processor may be implemented as one or more processor devices as are well known in the art. Similarly, the memory 504 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 504 is shown as internal to the system 500; however, the memory 504 can be internal, external or a combination of internal and external memory. Additionally, the system typically includes a power supply (not shown), which may be rechargeable, and/or it may receive power from an external source. While FIG. 5 illustrates the various components being coupled together via a bus, it is understood that the various components may actually be coupled to the control circuit 502 and/or one or more other components directly.

Generally, the control circuit 502 and/or electronic components of the system 500 can comprise fixed-purpose hard-wired platforms or can comprise a partially or wholly programmable platform. These architectural options are well known and understood in the art and require no further description here. The system and/or control circuit 502 can be configured (for example, by using corresponding programming as will be well understood by those skilled in the art) to carry out one or more of the steps, actions, and/or functions described herein. In some implementations, the control circuit 502 and the memory 504 may be integrated together, such as in a microcontroller, application specification integrated circuit, field programmable gate array or other such device, or may be separate devices coupled together.

The I/O interface 506 allows wired and/or wireless communication coupling of the system 500 to external components and/or or systems. Typically, the I/O interface 506 provides wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 508 may be used for user input and/or output display. For example, the user interface 508 may include any known input devices, such one or more buttons, knobs, selectors, switches, keys, touch input surfaces, audio input, and/or displays, etc. Additionally, the user interface 508 include one or more output display devices, such as lights, visual indicators, display screens, etc. to convey information to a user, such as but not limited to customer information, shopping lists, available items, requested items, product orders, product information, communication information (e.g., text messages, emails, etc.), status information, notifications, errors, conditions, and/or other such information. Similarly, the user interface 508 in some embodiments may include audio systems that can receive audio commands or requests verbally issued by a user, and/or output audio content, alerts and the like.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for detecting a low shelf item supply at a retail facility, the system comprising:
    a database storing data corresponding to a plurality of retail items disposed within the retail facility and an aisle location associated with some of the plurality of retail items;
    a plurality of aisles within the retail facility and aisle markers disposed within at least several of the plurality of aisles;
    a cart configured to received and transport items comprising the retail products;
    an image capturing device configured for use with the cart and configured to:
        record the aisle markers by which the cart travels during use to generate digital image data; and
        generate electronic data representing one or more timestamps indicating when each of the aisle markers was recorded by the image capturing device;
    a control circuit in communication with the image capture device and the database and configured to:
        analyze the digital image data including the recorded aisle markers received from the image capturing device associated with the cart and process the digital image data to correlate a time lapse between the one or more timestamps in order to determine a path of movement of the cart through the retail facility;
        analyze at least one image captured by the image capturing device associated with the cart and the path of movement of the cart through the retail facility to determine a list of items removed from at least one shelf at the retail facility;
        identify, based on an overlap between the path of movement of the cart through the retail facility and the list of the items determined by the control circuit to have been removed from the at least one shelf at the retail facility, a particular aisle location at the retail facility where one of the items was removed from at least one shelf at the retail facility is found;
        identify a low shelf item supply at the retail facility based upon an identification of the particular aisle location at the retail facility where the items were determined by the control circuit to have been removed from the at least one shelf; and
        generate an electronic notification of the low shelf supply.

2. The system of claim 1, wherein the database includes a plurality of aisle locations for some of the retail items.

3. The system of claim 2, wherein the control circuit is further configured to update the database to include the particular aisle location at the retail facility where one of the retail items was determined by the control circuit to have been removed from the at least one shelf.

4. The system of claim 1, wherein the aisle markers are disposed at predetermined intervals along the shopping aisles.

5. The system of claim 4, wherein the control circuit is further configured to estimate a continuous path of the cart through the retail facility based on the aisle markers recorded by the image capturing device and a chronological order of recordation of the aisle markers by the image capturing device.

6. The system of claim 5, wherein the control circuit is further configured to estimate a time spent by the cart at a specific location along the continuous path of the cart through the retail facility based on the time lapse between recordation of the aisle markers or repeatedly capturing a particular aisle marker by the image capturing device.

7. The system of claim 1, wherein the image capturing device is coupled to the cart and configured to record photo images or video images.

8. The system of claim 7, wherein the image capturing device is mounted onto one of a handle of the cart or onto a portion of the cart separate from the handle.

9. The system of claim 1 wherein the recorded aisle markers are cleared from the image capturing device after the path of movement of the cart through the retail facility is determined by the control circuit.

10. The system of claim 1 wherein the image capturing device is further configured to record shelf space at the retail facility, locations of the retail items on the at least one shelf, placement of the retail items onto the at least one shelf, and removal of the retail items from the at least one shelf.

11. A method of monitoring retail items on shelves at a retail facility, the method comprising:
    providing a database storing data corresponding to a plurality of the retail items disposed within the retail facility and an aisle location associated with some of the plurality of the retail items;
    providing a plurality of aisles within the retail facility and aisle markers disposed within at least several of the plurality of aisles;
    providing a cart configured to received and transport items comprising the retail products;

providing an image capturing device configured for use with the cart and configured to:
　　record the aisle markers by which the cart travels during use to generate digital image data;
　　generate electronic data representing one or more timestamps indicating when each of the aisle markers was recorded by the image capturing device;
providing a control circuit in communication with the image capture device and the database and configured to:
　　analyze the digital image data including the recorded aisle markers received from the image capturing device associated with the cart and process the digital image data to correlate a time lapse between the one or more timestamps in order to determine a path of movement of the cart through the retail facility;
　　analyze at least one image captured by the image capturing device associated with the cart and the path of movement of the cart through the retail facility to determine a list of items removed from at least one shelf at the retail facility;
　　identify, based on an overlap between the path of movement of the cart through the retail facility and the list of the items determined by the control circuit to have been removed from the at least one shelf at the retail facility, a particular aisle location at the retail facility where one of the items was removed from at least one shelf at the retail facility is found;
　　identify a low shelf item supply at the retail facility based upon an identification of the particular aisle location at the retail facility where the items were determined by the control circuit to have been removed from the at least one shelf; and
　　generate an electronic notification of the low shelf supply.

12. The method of claim 11, further comprising providing the database with a plurality of aisle locations for some of the retail items.

13. The method of claim 12, further comprising, via the control circuit, updating the database to include the particular aisle location at the retail facility where one of the retail items was determined by the control circuit to have been removed from at least one shelf at the retail facility.

14. The method of claim 11, further comprising disposing the aisle markers at predetermined intervals along the shopping aisles.

15. The method of claim 14, further comprising estimating, by the control circuit, a continuous path of the cart through the retail facility based on the aisle markers recorded by the image capturing device and a chronological order of recordation of the aisle markers by the image capturing device.

16. The method of claim 15, further comprising estimating, by the control circuit, a time spent by the cart at a specific location along the continuous path of the cart through the retail facility based on the time lapse between recordation of the aisle markers or repeatedly capturing a particular aisle marker by the image capturing device.

17. The method of claim 15, further comprising providing the cart with the image capturing device coupled thereto and configured to record photo images or video images.

18. The method of claim 17, further comprising providing the cart with the image capturing device mounted onto one of a handle of the cart or onto a portion of the cart separate from the handle.

19. The method of claim 11, further comprising clearing the recorded aisle markers from the image capturing device after the path of movement of the cart through the retail facility is determined by the control circuit.

20. The method of claim 11, further comprising recording, via the image capturing device, shelf space at the retail facility, locations of the retail items on the at least one shelf, placement of the retail items onto the at least one shelf, and removal of the retail items from the at least one shelf.

\* \* \* \* \*